US008988713B2

(12) United States Patent
Gutnik et al.

(10) Patent No.: US 8,988,713 B2
(45) Date of Patent: Mar. 24, 2015

(54) SECURE PRINTING IN A CLOUD-BASED PRINT SYSTEM

(75) Inventors: Yevgeniy Gutnik, Cupertino, CA (US); Kelly Lucas, San Jose, CA (US)

(73) Assignee: Google Inc., Mountain View, CA (US)

(*) Notice: Subject to any disclaimer, the term of this patent is extended or adjusted under 35 U.S.C. 154(b) by 137 days.

(21) Appl. No.: 13/536,624

(22) Filed: Jun. 28, 2012

(65) Prior Publication Data

US 2014/0002845 A1 Jan. 2, 2014

(51) Int. Cl.
| | |
|---|---|
| *G06K 15/00* | (2006.01) |
| *G06F 3/12* | (2006.01) |
| *G06F 21/60* | (2013.01) |
| *H04L 29/06* | (2006.01) |
| *H04L 9/30* | (2006.01) |

(52) U.S. Cl.
CPC ............ *G06F 3/1206* (2013.01); *G06F 3/1222* (2013.01); *G06F 3/1247* (2013.01); *G06F 3/1287* (2013.01); *G06F 3/1288* (2013.01); *G06F 21/608* (2013.01); *H04L 63/0428* (2013.01); *H04L 63/061* (2013.01)
USPC ........ 358/1.15; 358/1.13; 358/1.16; 358/402; 358/403; 713/171; 380/30; 380/278; 380/282

(58) Field of Classification Search
CPC ... G06F 3/1222; G06F 3/1232; G06F 3/1238; G06F 21/608; G06F 3/1225; G06F 3/1228; G06F 3/1288; G06F 3/1204; G06F 3/126; G06F 3/1273
USPC ........ 358/1.11–1.18, 400–404, 1.1, 523, 524; 380/277–282, 28; 713/191, 160–171; 726/17–21
See application file for complete search history.

(56) References Cited

U.S. PATENT DOCUMENTS

| 5,828,864 A | 10/1998 | Danknick et al. |
| 6,453,129 B1 | 9/2002 | Simpson et al. |

(Continued)

FOREIGN PATENT DOCUMENTS

| EP | 1465052 A2 | 10/2004 |
| JP | 2010181948 A | 8/2010 |

(Continued)

OTHER PUBLICATIONS

"Server Message Block", from Wikipedia, the free encyclopedia, Aug. 24, 2012, 9 pages.

(Continued)

*Primary Examiner* — Chad Dickerson
(74) *Attorney, Agent, or Firm* — Brake Hughes Bellermann LLP

(57) ABSTRACT

The embodiments provide a printing system including an application manager, implemented at a cloud print server, configured to receive a print job including encrypted content to be printed by a designated cloud-aware printer, over a network, from an application associated with a device, a print job router, implemented at the cloud print server, configured to route the print job including the encrypted content, over the network, to the designated cloud-aware printer to be decrypted, and a secure format converter configured to receive the print job including decrypted content from the designated cloud-aware printer, convert the print job from a printer-independent format to a printer-specific format associated with the designated cloud-aware printer, and provide the print job having the printer-specific format to the designated cloud-aware printer for printing.

18 Claims, 5 Drawing Sheets

(56) References Cited

U.S. PATENT DOCUMENTS

| | | | |
|---|---|---|---|
| 6,493,760 B1* | 12/2002 | Pendlebury et al. | 709/229 |
| 7,092,119 B1 | 8/2006 | Hinds et al. | |
| 7,367,060 B2 | 4/2008 | Someshwar | |
| 7,411,690 B2 | 8/2008 | Tsukada et al. | |
| 7,450,258 B2* | 11/2008 | Reese et al. | 358/1.15 |
| 8,189,225 B1* | 5/2012 | Lo et al. | 358/1.15 |
| 2004/0054962 A1* | 3/2004 | Shima et al. | 715/500 |
| 2004/0114175 A1 | 6/2004 | Cherry et al. | |
| 2004/0172586 A1* | 9/2004 | Ragnet et al. | 715/500 |
| 2005/0052677 A1* | 3/2005 | Maruyama | 358/1.13 |
| 2005/0158100 A1 | 7/2005 | Yamaguchi | |
| 2005/0273852 A1* | 12/2005 | Ferlitsch | 726/17 |
| 2006/0095500 A1 | 5/2006 | Kato | |
| 2006/0158680 A1 | 7/2006 | Fujinawa et al. | |
| 2007/0086054 A1 | 4/2007 | Ikeno | |
| 2007/0159650 A1 | 7/2007 | Takamatsu et al. | |
| 2007/0253020 A1 | 11/2007 | Hull et al. | |
| 2008/0137121 A1 | 6/2008 | Chrisop et al. | |
| 2008/0158597 A1* | 7/2008 | Hashimoto et al. | 358/1.15 |
| 2009/0063860 A1* | 3/2009 | Barnett et al. | 713/171 |
| 2009/0276266 A1 | 11/2009 | Nishiyama | |
| 2010/0302579 A1 | 12/2010 | Nuggehalli et al. | |
| 2010/0309508 A1 | 12/2010 | Kamath et al. | |
| 2010/0328707 A1 | 12/2010 | Miyake | |
| 2011/0075164 A1 | 3/2011 | Nordback | |
| 2011/0096354 A1 | 4/2011 | Liu | |
| 2011/0176162 A1* | 7/2011 | Kamath et al. | 358/1.15 |
| 2011/0222104 A1 | 9/2011 | Mohammad et al. | |
| 2011/0235085 A1 | 9/2011 | Jazayeri et al. | |
| 2011/0242554 A1 | 10/2011 | Farry et al. | |
| 2011/0299110 A1* | 12/2011 | Jazayeri et al. | 358/1.15 |
| 2011/0317197 A1* | 12/2011 | Makishima et al. | 358/1.13 |
| 2012/0057193 A1 | 3/2012 | Jazayeri | |

FOREIGN PATENT DOCUMENTS

| | | |
|---|---|---|
| KR | 2012-0064210 A | 6/2012 |
| WO | 2011115987 A2 | 9/2011 |

OTHER PUBLICATIONS

"CUPS", from Wikipedia, the free encyclopedia, Aug. 22, 2012, 10 pages.

"HP and RIM Announce Strategic Alliance to Mobilize Business on BlackBerry", Hewlett-Packard Development Company, L.P., May 4, 2009, 3 pages.

Ray, "HP Cloud Print: 100% and Absolutely Revolutionary", Aug. 21, 2007, 3 pages.

"Introducing ePrint", ePrintCenter, Hewlett-Packard Development Company, L.P., 2012, 1 page.

Internet Printing Protocol. from Wikipedia, Dec. 29, 2011, 3 pages.

"Print Server", from Wikipedia, the free encyclopedia, Jul. 31, 2012, 2 pages.

Search Report and Written Opinion for International Application No. PCT/US2011/028512, mailed Jun. 9, 2011, 13 pages.

Bhatti, et al., "Cloud-Based Printing for Mobile Devices", Proceedings of the SPIE, vol. 7540, 2010, pp. 75400A-75400A-8.

Non-Final Office Action for U.S. Appl. No. 12/725,067, mailed Sep. 27, 2012, 17 pages.

"Public-Key Cryptography", from Wikipedia, the free encyclopedia, Aug. 24, 2012, 12 pages.

Non-Final Office Action for U.S. Appl. No. 13/536,621, mailed Feb. 19, 2014, 39 pages.

Notice of Allowance for U.S. Appl. No. 12/725,067, mailed Mar. 25, 2013, 7 pages.

Search Report and Written Opinion for International Application No. PCT/US2013/048242, mailed Oct. 18, 2013, 11 pages.

* cited by examiner

SECURE PRINTING IN A CLOUD-BASED PRINT SYSTEM

TECHNICAL FIELD

This description relates to secure printing.

BACKGROUND

A cloud printing system may provide users with an ability to print content from virtually any application or device, using any cloud-aware printer. In other words, the cloud printing system may provide an ability for virtually any application running on any device within a network to communicate with a cloud print service, to thereby print to any printer that is also in communication with the cloud print service. In one example, an application may send a print request, over a network, to the cloud print server for printing a document using the cloud print service. In return, the cloud print server may provide a print dialog including a number of available cloud-aware printers, as well as printing options associated with each available cloud-aware printer. Upon selection of a cloud-aware printer and its corresponding printing options, the cloud print service may receive, over a network, a print job including the document subject to the print request in a printer-independent format, convert the print job to the selected printer specific format, and transmit the print job, over the network, to the cloud-aware printer for printing.

Because documents to be printed in the cloud printing system may be up-loaded to a server that is remote from the application, or are otherwise routed via a public network such as the internet, users may be concerned with using a cloud print service for printing confidential documents. However, rendering a secure printing mechanism within the cloud printing system presents its own set of challenges that are not encountered in conventional print paradigms.

SUMMARY

The details of one or more implementations are set forth in the accompanying drawings and the description below. Other features will be apparent from the description and drawings, and from the claims.

The embodiments provide a printing system including an application manager, implemented at a cloud print server, configured to receive a print job including encrypted content to be printed by a designated cloud-aware printer, over a network, from an application associated with a device, a print job router, implemented at the cloud print server, configured to route the print job including the encrypted content, over the network, to the designated cloud-aware printer to be decrypted, and a secure format converter configured to receive the print job including decrypted content from the designated cloud-aware printer, convert the print job from a printer-independent format to a printer-specific format associated with the designated cloud-aware printer, and provide the print job having the printer-specific format to the designated cloud-aware printer for printing.

According to one embodiment, the secure format converter may be implemented at the cloud print server. The secure format converter may be configured to receive the print job including the decrypted content, over the network, from the designated cloud-aware printer using a secure connection, and the print job router is configured to route the print job having the printer-specific format, over the network, to the designated cloud-aware printer using the secure connection. The secure format converter may be configured to perform the format conversion in memory such that the cloud print server does not store information related to the decrypted content.

According to another embodiment, the secure format converter may be implemented on a server within a private network associated with the device. The secure format converter may be configured to receive the print job including the decrypted content, over the private network, from the designated cloud-aware printer, and the secure format converter may be configured to provide the print job having the printer-specific format, over the private network, to the designated cloud-aware printer.

According to another embodiment, the secure format converter may be implemented on a server associated with a third party.

The application manager configured to receive a print job including encrypted content to be printed by a designated cloud-aware printer, over a network, from an application associated with a device may include the application manager configured to receive a secure print request for content to be printed by the designated cloud-aware printer, over the network, from the application, an encryption key manager configured to provide, over the network, an encryption key corresponding to the designated cloud-aware printer in response to the secure print request, and the application manager configured to receive the print job including the encrypted content, over the network, from the application. The encrypted content may be encrypted with the encryption key.

The application manager configured to receive the secure print request may include providing, over the network, a print dialog to a user of the application in response to a print request, the print dialog configured to provide one or more cloud-aware printers and an encryption option for selection by the user, and receiving, over the network, encryption option information indicating that the encryption option is enabled and printer selection information indicating the designated cloud-aware printer.

The embodiments also provide a method for secure printing. The method includes first receiving, at a cloud print server, a print job including encrypted content to be printed by a designated cloud-aware printer, over a network, from an application associated with a device, routing, by the cloud print server, the print job including the encrypted content, over the network, to the designated cloud-aware printer to be decrypted, second receiving, at a secure format converter, the print job including decrypted content from the designated cloud-aware printer, converting, by the secure format converter, the print job from a printer-independent format to a printer-specific format associated with the designated cloud-aware printer, and providing, by the secure format converter, the print job having the printer-specific format to the designated cloud-aware printer for printing.

In one embodiment, the secure format converter may be implemented at the cloud print server. The second receiving step may include receiving the print job including the decrypted content, over the network, from the designated cloud-aware printer using a secure connection and the providing step may include routing the print job having the printer-specific format, over the network, to the designated cloud-aware printer using the secure connection. The converting step may perform the format conversion in memory such that the cloud print server does not store information related to the decrypted content.

According to another embodiment, the secure format converter may be implemented on a server within a private network associated with the device. The second receiving step may include receiving the print job including the decrypted content, over the private network, from the designated cloud-aware printer, and the providing step may include routing the print job having the printer-specific format, over the private network, to the designated cloud-aware printer.

The first receiving step may include receiving a secure print request for content to be printed by the designated cloud-aware printer, over the network, from the application, providing, over the network, an encryption key corresponding to the designated cloud-aware printer in response to the secure print request, and receiving the print job including the encrypted content, over the network, from the application. The encrypted content may be encrypted with the encryption key.

The receiving the secure print request may include providing, over the network, a print dialog to a user of the application in response to a print request, the print dialog configured to provide one or more cloud-aware printers and an encryption option for selection by the user, and receiving, over the network, encryption option information indicating that the encryption option is enabled and printer selection information indicating the designated cloud-aware printer.

The embodiments also provide a non-transitory computer-readable medium storing instructions that when executed cause one or more processors to perform a secure printing process. The instructions comprising instructions to receive, at a cloud print server, a print job including encrypted content to be printed by a designated cloud-aware printer, over a network, from an application associated with a device, route, by the cloud print server, the print job including the encrypted content, over the network, to the designated cloud-aware printer to be decrypted, receive, at a secure format converter, the print job including decrypted content from the designated cloud-aware printer, convert, by the secure format converter, the print job from a printer-independent format to a printer-specific format associated with the designated cloud-aware printer, and provide, by the secure format converter, the print job having the printer-specific format to the designated cloud-aware printer for printing. The secure format converter may be implemented at the cloud print server or on a server within a private network associated with the device.

DETAILED DESCRIPTION

Figure 1:
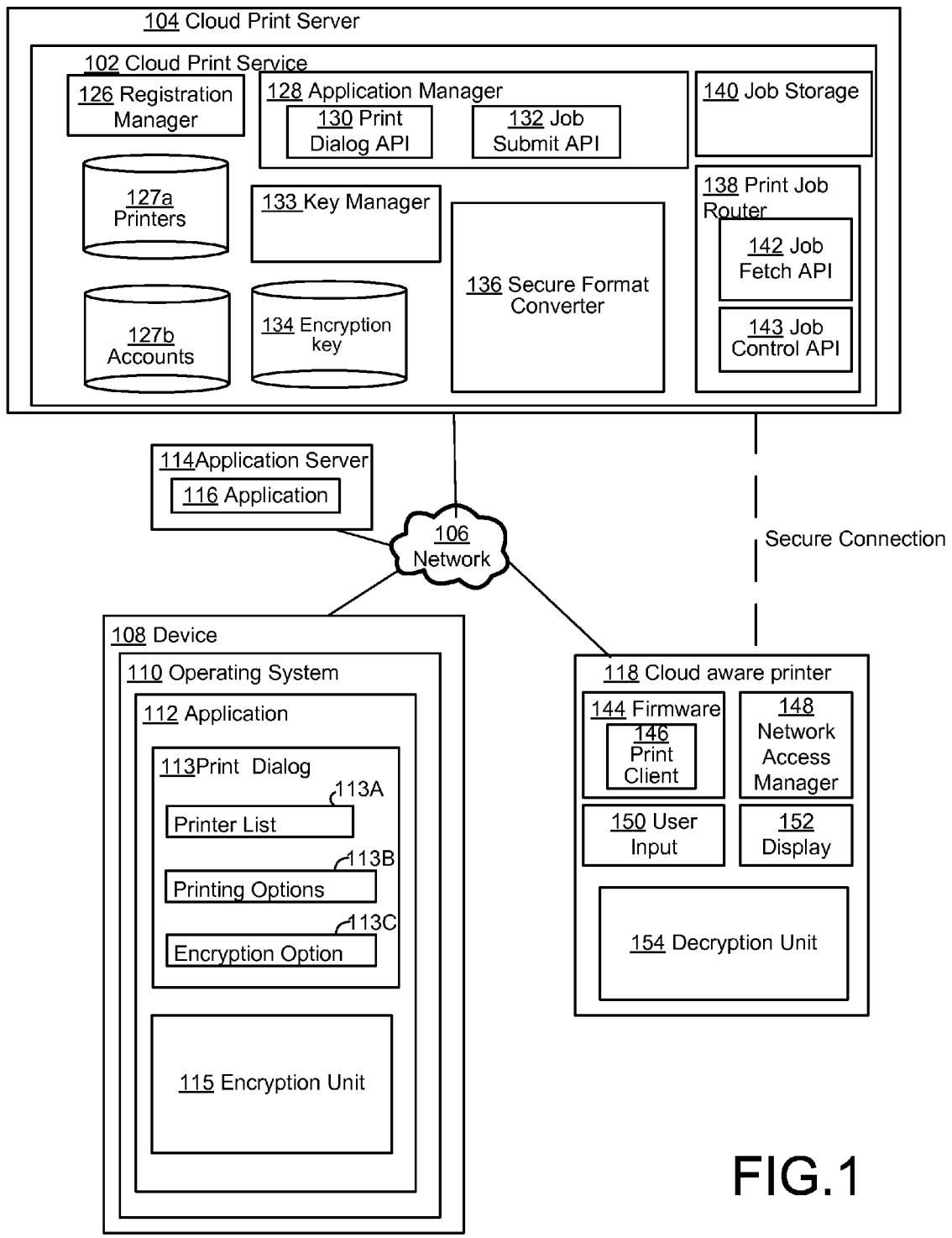
FIG. 1 is a block diagram of a system for secure printing using a cloud print service according to an embodiment.

FIG. 1 is a block diagram of a system for secure printing using a cloud print service 102 according to an embodiment. As shown in the example of FIG. 1, the cloud print service 102 may be executed on a cloud print server 104 which provides printing capabilities over a network 106. As described in detail below, the cloud print service 102 may provide a user with a uniform printing experience which is platform-independent and which unburdens the user of the need to configure, update, or otherwise maintain or oversee printer operations. Moreover, as also described herein in further detail, the cloud print server 104 may permit secure printing for documents that may be confidential in nature.

In FIG. 1, a device 108 is illustrated as an example of virtually any computing device from which a user may wish to execute a print job. By way of non-limiting example, then, the device 108 may include a laptop or desktop computer, a netbook, a tablet computer, a smartphone, a camera, or any device which may store or have access to content which the user may desire to print.

In the example of FIG. 1, an operating system 110 is illustrated as executing an application 112. Again, these elements are included by way of illustration and example, and may include virtually any operating system or other platform on which virtually any application may run. For example, the operating system 110 may include operating systems such as the Windows operating system, Mac OS, or Linux, and may include mobile platforms such as Android, Symbian, or iPhone OS, to name a few examples. In other examples, the operating system 110 may include a browser-based operating system, such as the Chrome OS.

Consequently, the application 112 may include virtually any application which may run on any underlying operating system or platform. Examples of such applications are well-known and too numerous to mention in any detail, but generally include document processing applications, email applications, image editing or presentation software, a web browser, or virtually any application which provides the user with a rendering of data content which the user may wish to print.

In particular, the application 112 may represent a web application which executes on a remote application server 114 as application 116. That is, the application 116 may include any application functionality which is accessed by the user over the network 106 and experienced locally as the application 112, e.g., using a browser running at the device 108. As is known, such web applications allow an owner of the application server 114 to assume responsibility for installing, configuring, executing, and maintaining the application 116 at the application server 114, so that the user of the device 108 may obtain the benefit of the application 116 without many or any of the associated costs and responsibilities. Techniques for executing such a web application, and related technology, are well known in the art and are therefore not described further in detail herein, except as may be helpful or necessary to understand operations of the system of FIG. 1.

The network 106 may thus represent, for example, the public Internet or other wide area public or private network. The network 106 may represent, in further examples, a corporate or other intranet, and/or a smaller-scale, local or personal network, any of which may be implemented using standard network technology.

Further in FIG. 1, a cloud-aware printer 118 is illustrated which is configured to communicate with the cloud print service 102 over the network 106. In this regard, the term "cloud" or "cloud-aware" references the use of "cloud computing," which, generally speaking, includes a style of computing in which computing resources such as application programs and file storage are remotely provided over a network such as the Internet, typically through a web browser. For example, many web browsers are capable of running applications, which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program. Thus, it may be observed that the application server 114 and associated application 116 may also represent examples of cloud computing. Although only one cloud-aware printer 118 is illustrated in FIG. 1, the example embodiments encompass any number of cloud-aware printers using the system of FIG. 1.

In the context of the cloud-aware printer 118, the cloud print service 102 enables the application 112 to print directly to the cloud-aware printer 118, without a requirement or need for (e.g., independently of), involvement of the operating system 110. In other words, the application 112 may communicate directly with the cloud print service 102 to thereby print to the cloud-aware printer 118, without e.g., requiring a local driver within the operating system 110. As a result, virtually any application 112 that may be configured to communicate with the cloud print service 118 may make use of the cloud-aware printer 118, as described in detail, below.

For example, the cloud print service 102 may be configured to register the user and/or the device 108, as well as the cloud-aware printer 118, or any other printer capable of using the system of FIG. 1. In a specific example, the device may be a smartphone, and the user may use the application 112 to purchase a ticket (e.g., a movie ticket, or an airline ticket). Then, the user may print the purchased ticket directly to the cloud-aware printer 118, even though the device 108 and/or the operating system 110 may not have the resources, or otherwise be configured, to support native printing in a conventional sense (e.g., may not currently be executing a print driver of any sort associated with the cloud-aware printer 118). In this way, the user of the application 112 may be provided with a print option and associated abilities that are not currently provided in conventional printing paradigms and techniques. Many other such examples are described herein, or would be apparent.

The cloud-aware printer 118 may be contrasted with a legacy printer, not specifically illustrated in FIG. 1, which does not natively support communication with the cloud print service 102. When using such a legacy printer, a separate device and/or software may be utilized to impart the advantages of the cloud print service 102 to the legacy printer. It will be appreciated that all the various features and functions of the cloud-aware printer 118 may be obtained through the use of a legacy printer supplemented with appropriate hardware/software support.

In short, the system provides an ability for virtually any application running on any device within the network 106 (e.g., the applications 112, 116 and device 108) to communicate with the cloud print service 102 to thereby print to any printer which is also in (direct or indirect) communication with the cloud print service 102. Consequently, users may benefit from increased printing options and abilities, and experience an overall decrease in the costs and efforts associated with doing so. Meanwhile, printer manufacturers may experience a decreased or eliminated need to provide users with the (updated) driver(s) and other prerequisites for users to fully experience the benefits of their products. This may result in, for example, higher customer satisfaction, and a decreased cost of producing and maintaining printers. In particular, as referenced above, the system may provide a number of enhanced features and functions related to the secure printing of documents using the cloud print service 102.

In one embodiment, the cloud print server 104 may use a public key cryptography mechanism (e.g., public/private key pair). For example, the cloud print server 104 may manage a plurality of public encryption keys corresponding to the registered cloud-aware printers, and when the cloud print server 104 receives a secure printing request designating a cloud-aware printer (e.g., the cloud-aware printer 118) from the application 112/116, the cloud print server 104 may provide, over the network 106, the public encryption key corresponding to the designated cloud-aware printer 118. Then, the content to be printed may be encrypted using the encryption key, and the encrypted content may be uploaded to the cloud print server 104. For example, the cloud print server 104 may receive the print job including the encrypted content, over the network 106, and then route the print job including the encrypted content to the designated cloud-aware printer 118. The designated cloud-aware printer 118 may decrypt the content using the corresponding private key stored on the designated cloud-aware printer 118. However, besides public key cryptography, the embodiments encompass any type of encryption/decryption mechanism such as a user-defined password mechanism. For example, instead of encrypting the content using the received public encryption key, the content may be encrypted using a password that has been provided by the user of the application. Then, the designated cloud-aware printer 118 may decrypt the content when the password is entered correctly by the user on an interface of the designated cloud-aware printer 118. However, the embodiments encompass any type of encryption/deception mechanism known in the art.

Also, because the cloud print server 104 receives the print job in a printer independent format, the cloud print server 104 or a server separate from the cloud print server 104 may provide a mechanism that converts the print job from the printer independent format to a printer-specific format. For example, after the designated cloud-aware printer 118 has decrypted the content (e.g. using the private encryption key, the user defined password, or any other method), a secure format converter 136 may convert the print job from the printer independent format to the printer-specific format, and provide the converted print job back to the designated cloud-aware printer 118 in order to carryout the printing operation. In one embodiment, the secure format converter 136 may be associated with the cloud print service 102 (e.g., shown in FIG. 1) or the secure format converter 136 may be associated with a private network (e.g., shown in FIG. 2).

Referring to FIG. 1, the application 112 may provide a print dialog 113 in conjunction with the cloud print service 102. The print dialog 113 includes a printer list 113A identifying a number of printers including the cloud-aware printer 118, the legacy printer, as well as any other available cloud-aware printer that is associated with a user account. For example, the printer list 113A may include the entire list of printers associated with the user account of the user for cloud printing. For example, the entire list of printers includes the cloud-aware printer 118 and/or the legacy printer, as well as other cloud-aware printers 118 and/or legacy printers that are associated with the cloud print service 102. In one example, the entire list of printers include the printers that are registered with the cloud print service 102 for a particular user as well as publically-available printers that have registered with the cloud print service 102. The publically available printers may include printers that located at a business (e.g., coffee shops, printing centers, etc.) that may charge a fee for printing. As referenced throughout this disclosure, the term cloud-aware printer encompasses the cloud-aware printer 118 and any type of printer that includes cloud capabilities such as the cloud-enabled legacy printer and the publically available printers.

Further, the print dialog 113 may include one or more printing options 113B corresponding to each of the printers in the printer list 113A, and an encryption option 113C. For example, the user may designate one of the cloud-aware printers in the printer list 113A, and if the user wishes to print using a secure printing mechanism, the user may select the encryption option 113C. The encryption option 113C may be any type of selectable printing option such as a check box or radio buttons, for example. In response to the printer selection and the encryption option selection, the application 112/116 may receive a public encryption key corresponding to the designated cloud-aware printer 118, over the network 106, from the cloud print service 102. Then, the content may be encrypted using the public encryption key. For example, the application 112 may include an encryption unit 115 that is configured to encrypt the content using the encryption key received from the cloud print service 102. In another embodiment, instead of using the public encryption key provided by the cloud print service 102, the encryption unit 115 may encrypt the content using a password defined by the user. For example, the encryption unit 115 may encrypt the content using the user defined password provided through the encryption option 113C (e.g., the encryption option 113C may include a portion that allows a user to enter a password). However, the encryption unit 115 may encrypt the content via any type of encryption mechanism known to one of ordinary skill in the art.

Referring to FIG. 1, the cloud print server 104 may include a number of example components or modules which may be utilized to implement functionalities of the cloud print service 102, and, in particular, may be utilized to implement the concepts and features related to the secure printing mechanisms. For example, the cloud print service 102 may include a registration manager 126, which may be configured to register printers and users. The registration manager 126 may be configured to receive a registration of the cloud-aware printer 118 and/or the legacy printer, including storing identification information therefore within a data store 127a of registered printers. Also, the registration manager 126 may receive the public encryption keys from the cloud-aware printers when the printers register with the cloud print service 102. Further, the registration manager 126 may be configured to register a user(s) who may currently or potentially wish to execute print jobs using the cloud print service 102, and to store identification information for such users within a data store 127b of registered users.

There are many examples scenarios and techniques by which users and/or printers may come to be registered with the cloud print server 104 though the registration manager 126. In general, for example, a user of the device 108 may use a browser to visit a website associated with the cloud print service 102, and may enter a username/password combination to establish a user account with the cloud print service 102. In some examples, users already may have a user account with a separate and possibly related service or service provider. For example, various online services (e.g., other cloud-based computing resources) may provide functionalities such as email, data storage, and document processing, and, in such cases, the user may already have a secure user account established in connection therewith. In such cases, the cloud print service 102 may leverage or access such existing user accounts, e.g., to avoid a need to create a new user account, and to facilitate access of existing users of other services with the cloud print service 102, such as, e.g., for implementation of the printer-sharing techniques just described.

It may be appreciated that although the registration manager 126 is illustrated as being included within the cloud print service 102, it also may occur that some or all functionality related to the registration manager 126 may exist externally to the cloud print service 102. For example, the application server 114 may provide an email application as the application 116, and a user of the device 108 may be registered with this email application (service). In such a case, the application server 114 may have the responsibility of maintaining the user's account, and the cloud print service 102 may simply interface with the application server 114 and provide access to the user once the user is logged on into the application 116.

According to the embodiments, the cloud print service 102 may include a key manager 133 and an encryption key database 134 that stores public encryption keys corresponding to the registered printers 127a. For example, when the printers register with the cloud print service 102 via the registration manager 126, the registration manager 126 may also receive the corresponding public encryption keys. The registration manager 126 may store the public encryption keys in the encryption key database 134.

Further in FIG. 1, an application manager 128 may be configured to communicate with any application which may be desired to be used for printing within the system of FIG. 1, including, e.g., the application 112, and the application 116. Thus, for example, the application manager 128 may implement various application programming interfaces (APIs) which enable such communication with external applications. For example, the application manager 128 may include a print dialog API 130, which may be configured to render the print dialog 113 including the printer list 113A, the printing options 113B, and the encryption option 113C. A job submit API 132 may be utilized to receive the identification of application content (e.g., the encrypted content), the selected printer and printing options submitted by the user by way of the print dialog 113. The application manager 128 may receive the print job in a format that is independent of a specific printer, e.g., generic with respect to all available or relevant printers within the system.

As indicated above, the application manager 128 may receive a print request over the network 106 from a user of the application 112/116, and provide the print dialog 113, over the network 106, to the user. The print dialog 113 includes the printer list 113A, the printing options 113B, and the encryption option 113C. In response, the user may designate a cloud-aware printer such as the cloud-aware printer 118 and select the encryption option 113C so that the content can be encrypted. Then, the application manager 128 may receive, over the network 106, encryption option information indicating that the encryption option 113C is enabled and printer selection information indicating the designated cloud-aware printer 118. The key manager 133 may provide, over the network 106, an encryption key corresponding to the designated cloud-aware printer 118. For example, the key manager 133 may select the appropriate encryption key from the encryption key database 134 corresponding to the designated cloud-aware printer 118, and transmit the encryption key over the network 106 to the application 112/116. The encryption unit 115 may encrypt the content to be printed using the encryption key according to methods that are well known in the art. The application manager 128 may then receive the print job including the encrypted content, over the network 106, from the application 112/116, and the print job may be in a format independent of a particular printer.

The print jobs received at the application manager 128 may be passed to a job storage 140 which may provide one or more types of data storage related to operations of the cloud print service 102. For example, the job storage 140 may store print jobs and related information, where such print jobs/information may be stored prior to transmission to the designated printer. For example, a print job may be stored in a printer-independent format in which the print job may have been received by the job submit API 132. Also, because the content is encrypted, the cloud print service 102 cannot obtain the details regarding the document to be printed.

According to the embodiments, a print job router 138 may be configured to route the print job including the encrypted content from the application manager 128 or the job storage 140 to a designated printer, e.g., the cloud-aware printer 118. The print job router 138 may further be configured to monitor and mediate execution and success/failure of a given print job. The print job router 138 may thus be responsible for managing and monitoring ongoing print jobs from a plurality of users, which may be designated for a corresponding plurality of printers, including the cloud-aware printer 118.

As shown, the print job router 138 may include or otherwise be associated with a job fetch API 142 and/or a job control API 143. For example, the job fetch API 142 may be configured to provide the print job to the cloud-aware printer 118, e.g., may be used by the cloud-aware printer 118 to fetch a desired print job. The job control API 143 may be responsible for authorizing the cloud-aware printer 118 as needed, and for receiving updated status information from the cloud-aware printer 118, e.g., whether the print job has completed or failed. Such status information also may be stored using the job storage 140, in association with the corresponding print job in question. The job control API 143 also may include status information including, e.g., whether a print job is currently queued by not yet downloaded to a corresponding printer, or spooled/downloaded and added to a native printer queue of the cloud-aware printer 118 (if applicable).

After the cloud-aware printer 118 has received the print job including the encrypted content, the cloud-aware printer 118 may decrypt the content. For example, a decryption unit 154 may retrieve its corresponding private encryption key and decrypt the content using the private encryption key. Alternatively, a user may enter the user-defined password on a user input 150, and the decryption unit 154 may decrypt the content using the user-defined password. However, the decryption unit 154 may decrypt the content according to any type of decryption mechanism known to one of ordinary skill in the art. The other components of the cloud-aware printer 118 are further described later in the disclosure.

After the decryption unit 154 has decrypted the content, the print job including the decrypted content may be routed back to the cloud print server 104 in order to convert the print job from the printer independent format to a printer-specific format corresponding to the designated cloud-aware printer 118. For example, the cloud print service 102 may include a secure format converter 136, which may be configured to receive the print job including the decrypted content over a secure connection, and facilitate or execute conversion of the print job into a format associated with the designated (type of) printer for the print job in question. Such conversion may thus generally include, as needed, conversion of the print data itself, as well as conversion of the print characteristics specified in conjunction with the given print job, as further explained below. Also, the secure format converter 136 is configured to perform the format conversion in memory such that the cloud print server 104 does not store information related to the decrypted content.

In more detail, as is known, printers generally require low-level, device or type-specific instructions which provide a base by which printers actually apply ink to paper to achieve a desired appearance. Such instructions may therefore include very specific portrayals of the desired print outcome using, e.g., a page description language (PDL). For example, the language postscript may be used to describe a desired print outcome, which may then be rendered (e.g., or rasterized) by a specific printer using a print text or images. Additionally, fixed-layout document formats exist which are designed to facilitate device-independent printing all maintaining documents available. For example, the portable document format (PDF) is an example of such format, where .PDF documents may be generated using postscript. Somewhat similarly, the XPS format provides such a fixed layout document, which is based on the eXtensible markup language (XML).

Thus, the encrypted content or other print data may be received from the application 112/116 in virtually any format, including, e.g., hypertext markup language (HTML), or in the format associated with document processing applications and/or images, or any of the formats referenced above. Further, after the decryption unit 154 has decrypted the content, the print job is still in the printer-independent format. The secure format converter 136 may thus be configured to receive print data in these and any other various formats, and to convert the print data into a format that is recognizable by a designated printer. Also, the secure format converter 136 receives the print job including the decrypted content, over the network 106, from the cloud-aware printer 118 via a secure connection line so that the conditional nature of the content is not comprised.

As referenced above, the secure format converter 136 may be configured to convert the print characteristics associated with the print job into a format that is recognizable by the designated printer 118. That is, as referenced above, the print characteristics may include aspects of how the print data should or can be printed; i.e., based on preferences of the user and/or (capabilities, or lack thereof) of the designated printer. The secure format converter 136 may thus provide appropriate conversion, depending on a selected printer and/or on preferences of the user. The secure format converter 136 may then provide and execute a resulting, converted print job using, e.g., a protocol referred to herein as the cloud print protocol (CPP). Thus, the cloud print protocol allows the cloud print service 102 to communicate with the cloud-aware printer 118 (or with a legacy printer enabled to communicate with the cloud print service 102).

Then, the secure format converter 136 is configured to provide the converted print job back to the cloud-aware printer 118 so that the cloud-aware printer 118 may execute the print job. The cloud-aware printer 118 may utilize various hardware/software components during normal printing operations. For example, during execution, the print job router 138 may be configured to communicate with, e.g., a print client 146 executing on firmware 144 of the cloud-aware printer 118. The print client 146 may communicate with the cloud print service 102, e.g., with the print job router 138, using the cloud print protocol referenced herein.

More specifically, the print client 146 may be configured to register the cloud-aware printer 118 with the cloud print service 102, and to thereby associate the thus-registered printer 118 with a user of the device 108. Also, the print client 146 may provide its public encryption key via the registration manager 126 for storage in the encryption key database 134 when registering with the cloud print service 102. Moreover, the print client 146 may be configured to actually drive the cloud-aware printer 118 and thereby execute the desired printing according to the converted print job.

In the example of FIG. 1, the cloud-aware printer 118 is illustrated as including the print client 146 within the firmware 144. The firmware 144, as would be appreciated by one of skill in the art, may represent factory installed hardware and/or software which provides designated functions without generally requiring or allowing user modification or configuration (e.g., may utilize read-only memory). Thus, the cloud-aware printer 118 may be preconfigured from before time of purchase to communicate and coordinate with the cloud print service 102, to thereby provide a convenient and enjoyable user experience.

For example, the cloud-aware printer 118 may include a network access manager 148, the user input 150, and a display (or other user output) 152, which may generally represent otherwise-conventional components that are therefore not described here in detail except as may be needed to assist in understanding example operations of the system. Of course, the cloud-aware printer 118 need not include all of the components 144-154, and/or may include additional or alternative components, which are also not discussed here in detail.

In the example of FIG. 1, the network access manager 148 may represent associated hardware/software which enables a cloud-aware printer 118 to communicate over the network 106 with the cloud print service 102. For example, such communication may be conducted wirelessly if the cloud-aware printer 118 is within range of an appropriate wireless network. In other examples, the network access manager 148 may enable a wired connection of the cloud-aware printer 118 to the network 106, e.g., by way of connection to an appropriate router.

The user input 150 may represent virtually any sort of keypad, stylus, or other input technique for entering data to the cloud-aware printer 118 including the user-defined password. Similarly, the display 152 may represent virtually any sort of audio and/or video display to output information to the user 125 or other user of the cloud-aware printer 118.

It will be appreciated that many other configurations of the cloud-aware printer 118 or other printers are contemplated for use in conjunction with the system. For example, as referenced above, a legacy printer, not specifically illustrated in the example of FIG. 1, may lack some of the functionality of the cloud-aware printer 118. For example, such a legacy printer may not have the network access manager 148 and/or the firmware 144 which may be utilized to implement the print client 146 and otherwise communicate with the cloud print service 102. In such cases, the print client 146 may be configured to execute on or in conjunction with a computing device which is in communication with the legacy printer, and which has the available resources necessary to implement the functionalities described herein, and which may include an otherwise conventional printer driver communicating with the legacy printer in question. Other variations and implementations of the printer 118 or related printers would be apparent, and are not described here in detail, except as may be necessary or helpful in understanding operations of the roving printer scenarios described herein.

Figure 2:
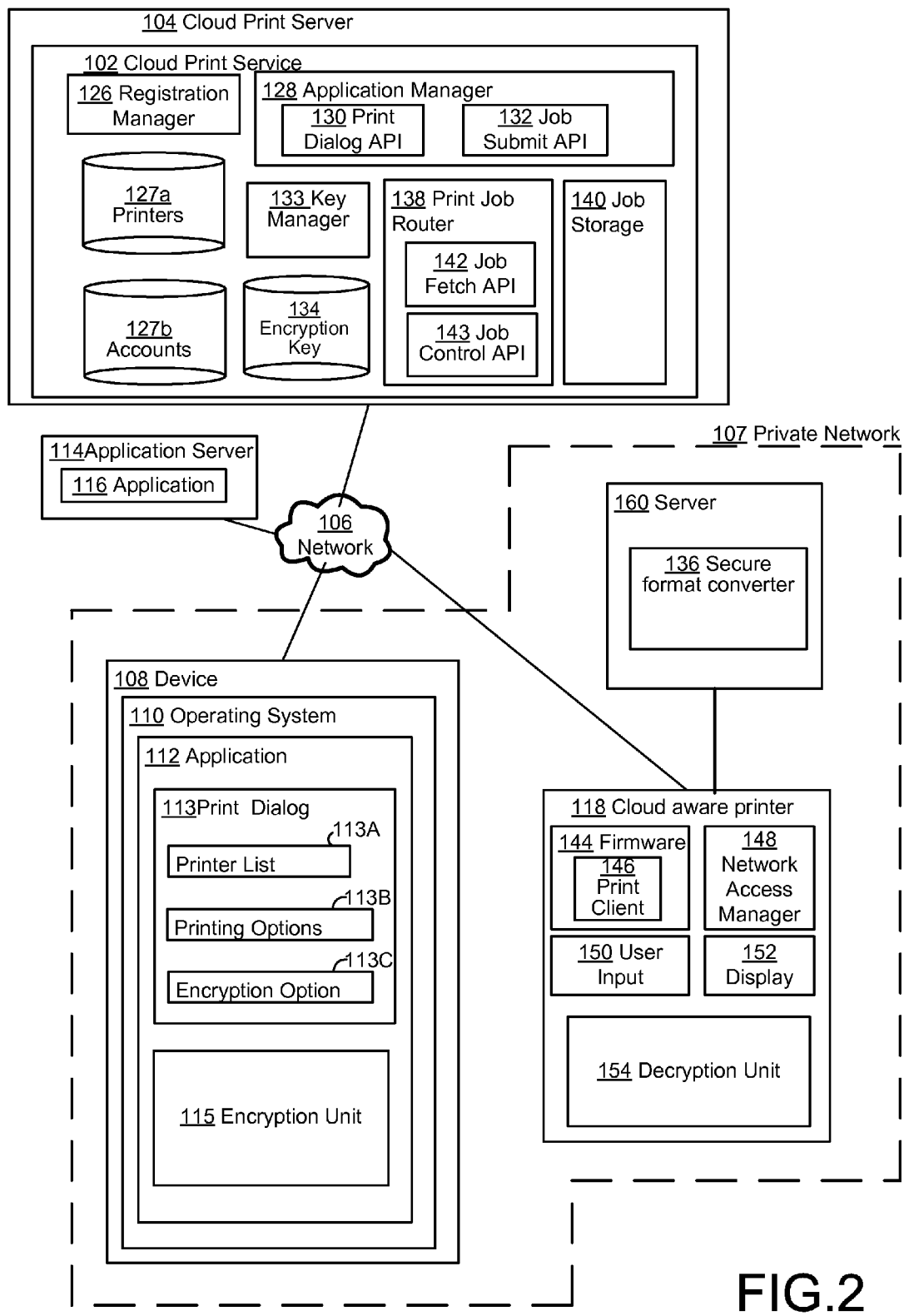
FIG. 2 is a block diagram of a system for secure printing using the cloud print service according to another embodiment.

FIG. 2 is a block diagram of a system for secure printing using the cloud print service 102 according to another embodiment. The system of FIG. 2 is the same as the system of FIG. 1 except that the secure format converter 136 is not associated with the cloud print service 102. Rather, the secure format converter 136 may be implemented on a server 160 within a private network 107 associated with the device 108. The secure format converter 136 may not be connected to, or otherwise associated with, the cloud print service 102. The private network 107 may be any type of network associated with the user and/or organization of the device 108 that is not open to the public. Further, the network 107 may represent a corporate or other intranet, and/or a smaller-scale, local or personal network, any of which may be implemented using standard network technology. Also, it may be characterized that the device 108, the server 160 and the cloud-aware printer 118 may be within a firewall implemented by the private network 107. As such, the server 160 having the secure format converter 136 may be located within a trusted network of the user/organization, and may be secure. As such, the content will be transmitted and received by the cloud-aware printer 118 located within the same secure network as the secure format converter 136.

In this example, after the decryption unit 154 has decrypted the content, the print job including the decrypted content may be provided to the secure format converter 136 located in the same secure network. For example, the secure format converter 136 of FIG. 2 may receive the print job including the decrypted content, over the private network 107, from the cloud-aware printer 118. The secure format converter 136 is configured to convert the print job from the printer-independent format to the printer-specific format associated with the cloud-aware printer 118 in the same manner as previously described with reference to FIG. 1. Then, the secure format converter 136 is configured to provide the print job having the printer-specific format, over the private network 107, to the designated cloud-aware printer 118.

In addition, according to another embodiment, the secure format converter 136 may be hosted by a server associated with a trusted third-party company and accessed using a secure connection. For example, a small business who host all emails and documents at a third-party company may use the secure format converter 136 provided by the same company. In particular, after the decryption unit 154 has decrypted the content, the print job including the decrypted content may be provided to the secure format converter 136 located at the server of the third party company. For example, the secure format converter 136 may receive the print job including the decrypted content, over the network 106, via a secure connection, from the cloud-aware printer 118. The secure format converter 136 is configured to convert the print job from the printer-independent format to the printer-specific format associated with the cloud-aware printer 118 in the same manner as previously described with reference to FIG. 1. Then, the secure format converter 136 is configured to provide the print job having the printer-specific format, over the network 106 via the secure connection, to the designated cloud-aware printer 118.

Figure 3:
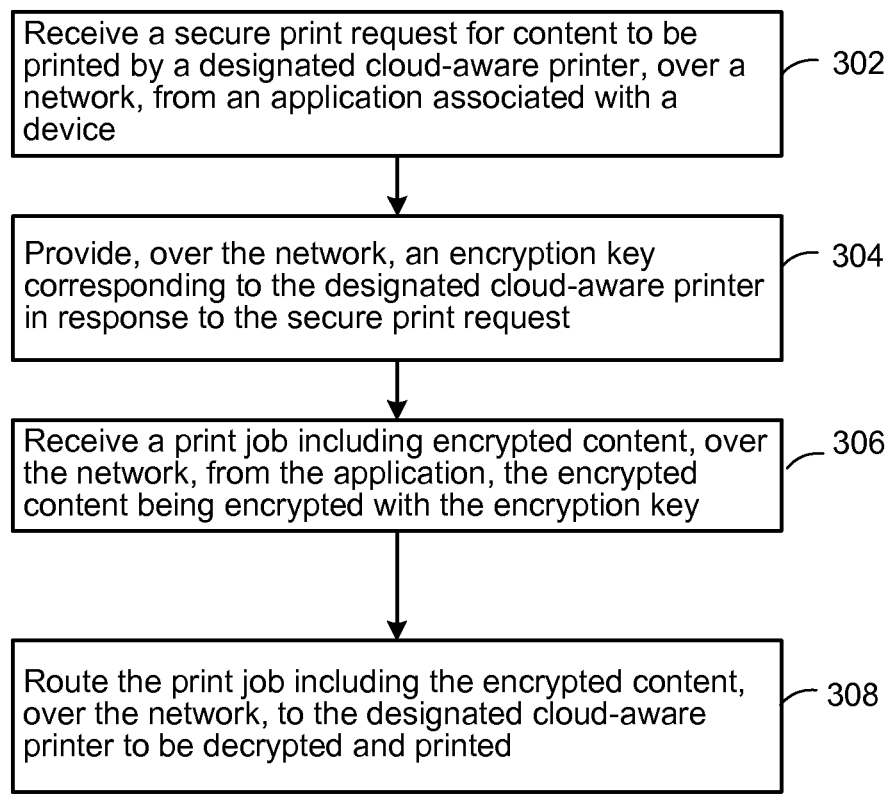
FIG. 3 is a flowchart illustrating example secure printing operations of the system of FIG. 1 or FIG. 2 according to an embodiment.

FIG. 3 is a flowchart 300 illustrating example secure printing operations 302-308 of the system of FIGS. 1 and 2 according to the embodiments. Although the flowchart 300 of FIG. 3 illustrates the operations 302-308 in sequential order, it will be appreciated that this is merely an example, and that additional or alternative operations may be included. Further, operations of FIG. 3 and related operations may be executed in a different order than that shown, or in a parallel or overlapping fashion.

A secure print request for content to be printed by a designated cloud-aware printer may be received, over a network, from an application associated with a device (302). For example, the application manager 128 may receive a secure print request for content to be printed by the designated cloud-aware printer 118, over the network 106, from the application 112/116 associated with the device 108. In more detail, the application manager 128 may receive a print request over the network 106 from a user of the application 112/116, and provide the print dialog 113, over the network 106, to the user. The print dialog 113 includes the printer list 113A, the printing options 113B, and the encryption option 113C. In response, the user may designate a cloud-aware printer such as the cloud-aware printer 118 and select the encryption option 113C so that the content can be encrypted. Then, the application manager 128 may receive, over the network 106, encryption option information indicating that the encryption option 113C is enabled and printer selection information indicating the designated cloud-aware printer 118.

An encryption key corresponding to the designated cloud-aware printer may be provided over the network in response to the secure print request (304). For example, the key manager 133 may provide, over the network 106, an encryption key corresponding to the designated cloud-aware printer 118. In particular, the key manager 133 may select the appropriate encryption key from the encryption key database 134 corresponding to the designated cloud-aware printer 118, and transmit the encryption key over the network 106 to the application 112/116. Then, the encryption unit 115 may encrypt the content to be printed using the encryption key according to methods that are well known in the art.

A print job including encrypted content may be received over the network from the application (306). For example, the application manager 128 may receive the print job including the encrypted content, over the network 106, from the application 112/116. The print job including the encrypted content may be routed over the network to the designated cloud-aware printer to be decrypted and printed (308). For example, the print job router 138 may be configured to route the print job including the encrypted content to a designated printer, e.g., the cloud-aware printer 118.

Figure 4:
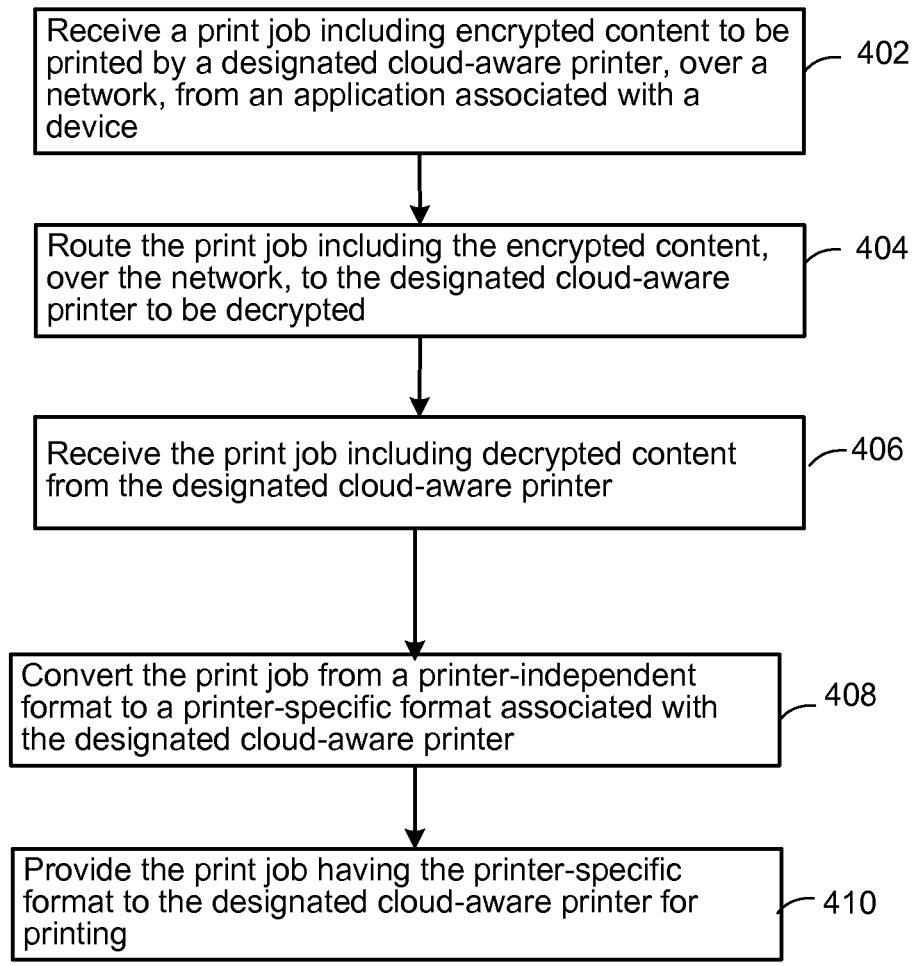
FIG. 4 is a flowchart illustrating example secure printing operations of the system of FIG. 1 or FIG. 2 according to another embodiment.

FIG. 4 is a flowchart 400 illustrating example operations 402-410 of the system of FIGS. 1 and 2 according to an embodiment. Although the flowchart 400 of FIG. 4 illustrates the operations 402-410 in sequential order, it will be appreciated that this is merely an example, and that additional or alternative operations may be included. Further, operations of FIG. 4 and related operations may be executed in a different order than that shown, or in a parallel or overlapping fashion.

A print job including encrypted content to be printed by a designated cloud-aware printer may be received over a network from an application associated with a device (402). For example, the application manager 128 may receive the print job including the encrypted content, over the network 106, from the application 112/116. In more detail, the application manager 128 may receive a print request over the network 106 from a user of the application 112/116, and provide the print dialog 113, over the network 106, to the user. The print dialog 113 includes the printer list 113A, the printing options 113B, and the encryption option 113C. In response, the user may designate a cloud-aware printer such as the cloud-aware printer 118 and select the encryption option 113C so that the content can be encrypted. Then, the application manager 128 may receive, over the network 106, encryption option information indicating that the encryption option 113C is enabled and printer selection information indicating the designated cloud-aware printer 118. Then, the key manager 133 may provide, over the network 106, an encryption key corresponding to the designated cloud-aware printer 118. The encryption unit 115 may encrypt the content to be printed using the encryption key according to methods that are well known in the art. Alternatively, instead of using the encryption key, the encryption unit 115 may encrypt the content using the user-defined password as explained above, or any other type of encryption mechanism. Then, the application manager 128 may receive the print job including the encrypted content, over the network 106, from the application 112/116.

The print job including the encrypted content may be routed over the network to the designated cloud-aware printer to be decrypted (404). For example, the print job router 138 may be configured to route the print job including the encrypted content to a designated printer, e.g., the cloud-aware printer 118. After the cloud-aware printer 118 has received the print job including the encrypted content, the cloud-aware printer 118 may decrypt the content. For example, the decryption unit 154 may retrieve its corresponding private encryption key and decrypt the content using the private encryption key. Alternatively, a user may enter the user-defined password on a user input 150, and the decryption unit 154 may decrypt the content using the user-defined password. However, the decryption unit 154 may decrypt the content according to any type of decryption mechanism known to one of ordinary skill in the art.

The print job including the decrypted content may be received from the designated cloud-aware printer (406). In one embodiment, the print job including the decrypted content may be routed back to the cloud print server 104 in order to convert the print job from the printer independent format to a printer-specific format corresponding to the designated cloud-aware printer 118, as shown in FIG. 1. For example, the cloud print service 102 may include the secure format converter 136, which may be configured to receive the print job including the decrypted content over the secure connection. In another embodiment, with respect to FIG. 1, the secure format converter 136 may be implemented on a server 160 within a private network 107 associated with the device 108. The secure format converter 136 may not be connected to, or otherwise associated with, the cloud print service 102. For example, the secure format converter 136 of FIG. 2 may receive the print job including the decrypted content, over the private network 107, from the cloud-aware printer 118.

The print job may be converted from a printer-independent format to a printer-specific format associated with the designated cloud-aware printer (408). For example, the secure format convertor of FIG. 1 or FIG. 2 may convert the printer-independent format to the printer-specific format associated with the designated cloud-aware printer 118, e.g., the print characteristics associated with the print job into a format that is recognizable by the designated printer 118. That is, as referenced above, the print characteristics may include aspects of how the print data should or can be printed; i.e., based on preferences of the user and/or (capabilities, or lack thereof) of the designated printer. The secure format converter 136 may thus provide appropriate conversion, depending on a selected printer and/or on preferences of the user. Also, the secure format converter 136 may be configured to perform the format conversion in memory such that the cloud print server 104 does not store information related to the decrypted content.

The print job having the printer-specific format may be provided to the designated cloud-aware printer for printing (410). In one embodiment, the secure format converter 136 is configured to provide, over the network 106, the converted print job back to the cloud-aware printer 118 so that the cloud-aware printer 118 may execute the print job, as shown in FIG. 1. In another embodiment, the secure format converter 136 is configured to provide the print job having the printer-specific format, over the private network 107, to the designated cloud-aware printer 118 so that the cloud-aware printer 118 may execute the print job, as shown in FIG. 2.

Many other examples and variations of the systems and operations of FIGS. 1 to 4 would be apparent to one skilled in the art. For example, instead of printing to a hardware printer, the system may be used to print to PDF or other software format.

Figure 5:
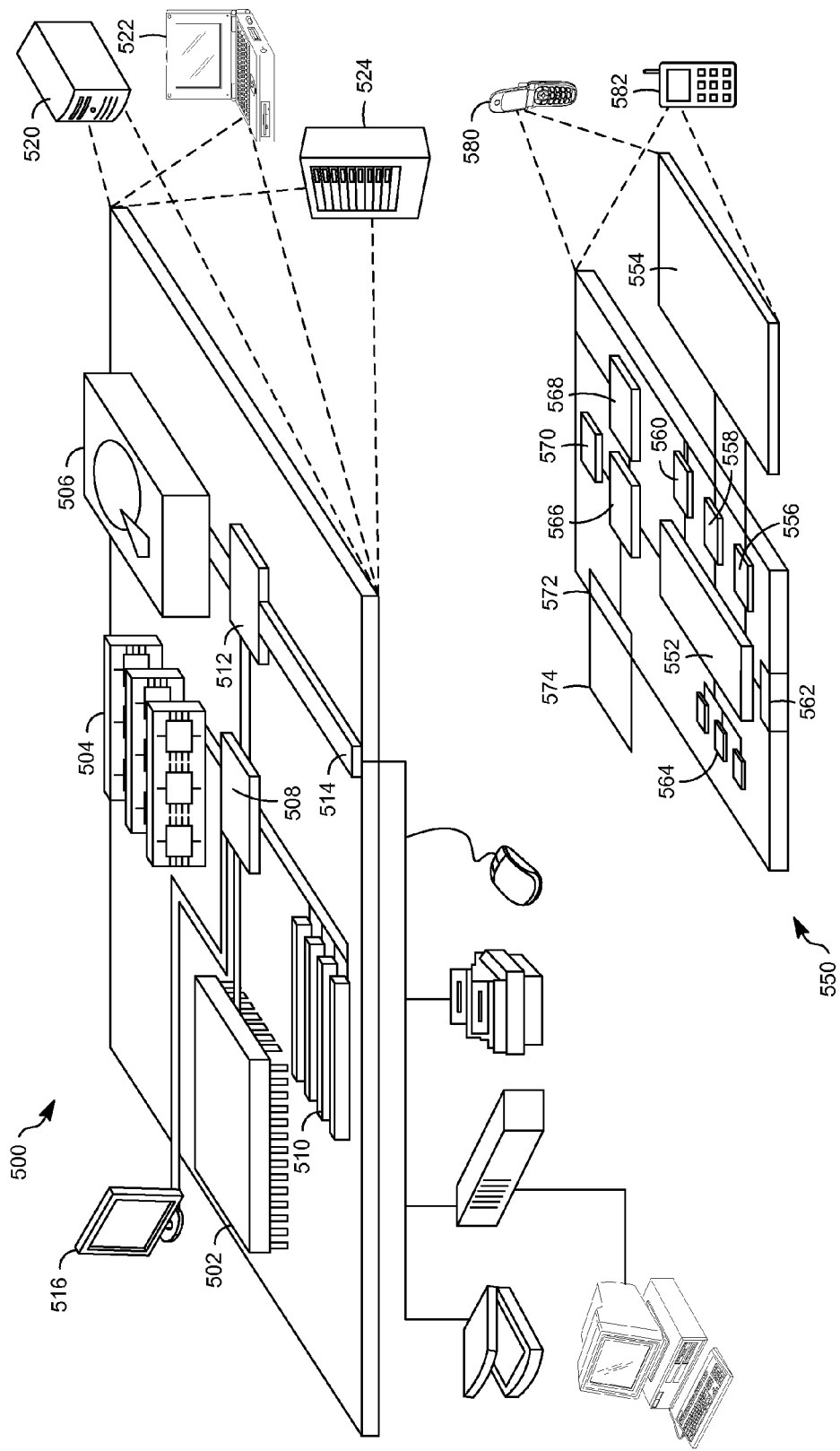
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A printing system, comprising:
   at least one semi-conductor processor;
   a non-transitory computer readable medium storing executable instructions that when executed by the at least one semi-conductor processor are configured to implement,
   an application manager, implemented at a cloud print server, configured to receive, over a non-secure internet connection, a secure print request for content to be printed by a designated cloud-aware printer from an application associated with a device;
   in response to receiving the secure print request, the application manager is configured to provide, over the non-secure internet connection, a print dialog to a user of the application at the device, the print dialog configured to provide a list of cloud-aware printers associated with a user account of the user and printing options, the print dialog providing an encryption option for selection by the user, the encryption option being a selectable user interface (UI) element,
   the application manager is configured to receive, over the non-secure internet connection, encryption option information indicating that the encryption option is enabled and printer selection information indicating the selection of the designated cloud-aware printer,
   an encryption key manager, implemented at the cloud print server, configured to manage public encryption keys stored in an encryption key database for printers interfacing with the cloud print server, the encryption key manager configured to select a public encryption key from the encryption key database that corresponds to the designated cloud-aware printer and send, over the non-secure internet connection, the public encryption key to the device;
   the application manager, implemented at the cloud print server, configured to receive a print job including encrypted content to be printed by the designated cloud-aware printer, over the non-secure internet connection, from the device, the encrypted content having been encrypted by the device using the public encryption key;
   a print job router, implemented at the cloud print server, configured to route the print job including the encrypted content, over the non-secure internet connection, to the designated cloud-aware printer to be decrypted with a private decryption key maintained at the designated cloud-aware printer; and
   a secure format converter, implemented at the cloud print server, configured to receive the print job including decrypted content, over the internet using a secure connection, from the designated cloud-aware printer, the secure connection being a secure network connection line between the cloud print server and the designed cloud-aware printer such that the decrypted content is not compromised when transferred between the secure format converter and the designated cloud-aware printer,
   the secure format converter configured to convert the print job from a printer-independent format to a printer-specific format associated with the designated cloud-aware printer,
   the secure format converter configured route, over the secure connection, the converted print job having the decrypted content in the printer-specific format back to the designated cloud-aware printer for printing.

2. The printing system of claim 1, wherein the designated cloud-aware printer is within a private network, and the secure format converter is outside a firewall implemented by the private network.

3. The printing system of claim 1, wherein the secure format converter is configured to communicate with the designated cloud-aware printer over the secure connection using a cloud print protocol that allows the designated cloud-aware printer to directly communicate with the cloud print server.

4. The print system of claim 1, wherein the print job router includes an application programming interface (API) to interface with the printers such that the print job is routed to the designated cloud-aware printer using the API.

5. The printing system of claim 1, further comprising:
   a registration manager configured to receive, over the internet, a public encryption key during registration of a printer with the cloud print server, the registration manager being configured to store the public encryption key in the encryption key database.

6. The printing system of claim 1, wherein the secure format converter configured to convert the print job from the printer-independent format into the printer-specific format includes determining at least one printer command associated with the designated cloud-aware printer for use by the designated cloud-aware printer in executing the converted print job.

7. The printing system of claim 1, wherein the secure format converter is configured to convert the print job in memory such that the cloud print server does not maintain a record of the content to be printed.

8. The printing system of claim 1, wherein the application manager includes at least two application programming interfaces (APIs), the application manager including a print dialog API to render the print dialog with the list of cloud-aware printers, the encryption option, and printing options, and a job submit API to receive the print job with the selection of the designated cloud-aware printer and any selected printing options.

9. A method for secure printing, the method being performed by at least one semi-conductor processor, the method comprising:
   receiving, at a cloud print server, a secure print request for content to be printed by a designated cloud-aware printer, over the non-secure internet connection, from an application associated with a device;
   in response to receiving the secure print request, the application manager providing, over the non-secure internet connection, a print dialog to a user of the application at the device, the print dialog configured to provide a list of cloud-aware printers associated with a user account of the user and printing options, the print dialog providing an encryption option for selection by the user, the encryption option being a selectable user interface (UI) element,
   the application manager receiving, over the non-secure internet connection, encryption option information indicating that the encryption option is enabled and printer selection information indicating the selection of the designated cloud-aware printer,
   selecting, by the cloud print server, a public encryption key from an encryption key database that corresponds to the designated cloud-aware printer, the encryption key database storing public encryption keys for printers interfacing with the cloud print server;

managing, by an encryption key manager implemented at the cloud print server, public encryption keys stored in an encryption key database for printers interfacing with the cloud print server, the encryption key manager configured to select a public encryption key from the encryption key database that corresponds to the designated cloud-aware printer;

sending, over the non-secure internet connection, by the cloud print server, the public encryption key to the device;

receiving, at the cloud print server, a print job including encrypted content to be printed by the designated cloud-aware printer, over the non-secure internet connection, from the device, the encrypted content having been encrypted by the device using the public encryption key;

routing, by the cloud print server, the print job including the encrypted content, over the non-secure internet connection, to the designated cloud-aware printer to be decrypted with a private decryption key maintained at the designated cloud-aware printer;

receiving, at a secure format converter implemented at the cloud print server, the print job including decrypted content from the designated cloud-aware printer over the internet using a secure connection, the secure connection being a secure network connection line between the cloud print server and the designed cloud-aware printer such that the decrypted content is not compromised when transferred between the server format converter and the designated cloud-aware printer;

converting, by the secure format converter, the print job from a printer-independent format to a printer-specific format associated with the designated cloud-aware printer; and routing, by the secure format converter, over the secure connection, the print job having the decrypted content in the printer-specific format back to the designated cloud-aware printer for printing, wherein the encrypted content is routed from the device to the designated cloud-aware printer via the cloud print server using an internet connection, but the decrypted content is routed between the designated cloud-aware printer and the cloud print server using the secure network connection line.

10. The method of claim 9, wherein the designated cloud-aware printer is associated within a private network, and the secure format converter is outside a firewall implemented by the private network.

11. The method of claim 9, wherein the print job having the decrypted content in the printer-specific format is routed back to the designated cloud-aware printer using a cloud print protocol.

12. The method of claim 9, wherein the converting step performs the format conversion using an in-memory conversion technique such that the decrypted content is not persisted to the cloud print server.

13. The method of claim 9, wherein the converting step includes determining at least one printer command associated with the designated cloud-aware printer for use by the designated cloud-aware printer in executing the converted print job.

14. The method of claim 9, further comprising:
receiving, at the cloud print server, a public encryption key from a printer during registration of the printer with the cloud print server, the public encryption key being received in conjunction with printer characteristics about the printer;

registering, by the cloud printer server, the printer with the cloud print server including storing the public encryption key in the encryption key database; and associating the registered printer with a user account of a user of the device.

15. The method of claim 14, wherein the user account is associated with at least one other web service in addition to cloud printing.

16. A non-transitory computer-readable medium storing instructions that when executed cause at least one semi-conductor processor to perform a secure printing process, the instructions comprising instructions to:

receiving, at a cloud print server, a secure print request for content to be printed by a designated cloud-aware printer, over the non-secure internet connection, from an application associated with a device;

in response to receiving the secure print request, the application manager at a cloud print server providing, over the non-secure internet connection, a print dialog to a user of the application at the device, the print dialog configured to provide a list of cloud-aware printers associated with a user account of the user, printing options, and the print dialog providing an encryption option for selection by the user, the encryption option being a selectable user interface (UI) element, the application manager receiving, over the non-secure internet connection, encryption option information indicating that the encryption option is enabled and printer selection information indicating the selection of the designated cloud-aware printer, managing, by an encryption key manager implemented at the cloud print server, public encryption keys stored in an encryption key database for printers interfacing with the cloud print server, the encryption key manager configured to select a public encryption key from the encryption key database that corresponds to the designated cloud-aware printer;

transmit, by the cloud print server, a public encryption key to a device in response to a secure printing request;

receive, at the cloud print server, a print job including encrypted content to be printed by a designated cloud-aware printer, over a non-secure internet connection, from an application associated with the device, the encrypted content having been encrypted by the device using the public encryption key;

route, by the cloud print server, the print job including the encrypted content, over the non-secure internet connection, to the designated cloud-aware printer to be decrypted with a private decryption key maintained at the designated cloud-aware printer;

receive, at a secure format converter implemented at the cloud print server, over a secure internet connection, the print job including decrypted content from the designated cloud-aware printer, the secure internet connection being a secure network connection line between the cloud print server and the designed cloud-aware printer such that the decrypted content is not compromised when transferred between the server format converter and the designated cloud-aware printer;

convert, by the secure format converter, the print job from a printer-independent format to a printer-specific format associated with the designated cloud-aware printer, the print job being converted in-memory such that a record of the decrypted content is not maintained at the cloud print server; and route, by the secure format converter, over the secure internet connection, the print job having the decrypted content in the printer-specific format back to the designated cloud-aware printer for printing.

17. The non-transitory computer-readable medium of claim 16, wherein the designated cloud-aware printer is within a private network, and the secure format converter is outside a firewall implemented by the private network.

18. The non-transitory computer-readable medium of claim 16, wherein the application is a web browser providing access to a web application executing on a remote server.

* * * * *

UNITED STATES PATENT AND TRADEMARK OFFICE
CERTIFICATE OF CORRECTION

| | |
|---|---|
| PATENT NO. | : 8,988,713 B2 |
| APPLICATION NO. | : 13/536624 |
| DATED | : March 24, 2015 |
| INVENTOR(S) | : Yevgeniy Gutnik et al. |

It is certified that error appears in the above-identified patent and that said Letters Patent is hereby corrected as shown below:

In The Claims

In column 20, line 13, in claim 4, delete "print" and insert -- printing --, therefor.

Signed and Sealed this
Twenty-eighth Day of July, 2015

Michelle K. Lee
*Director of the United States Patent and Trademark Office*